United States Patent [19]
Tsuji et al.

[11] Patent Number: 5,708,076
[45] Date of Patent: Jan. 13, 1998

[54] ROOM TEMERATURE-CURABLE ORGANOPOLYSILOXANE COMPOSITION

[75] Inventors: Yuichi Tsuji; Miyoji Fukayama, both of Chiba, Japan

[73] Assignee: Dow Corning Toray Silicone Co., Ltd., Tokyo, Japan

[21] Appl. No.: 789,450

[22] Filed: Jan. 27, 1997

[51] Int. Cl.⁶ .................................................. C08K 3/14
[52] U.S. Cl. .................. 524/788; 528/15; 524/403; 524/425; 524/437; 524/785; 524/786
[58] Field of Search ............................... 528/15; 524/403, 524/425, 437, 785, 786, 788

[56] References Cited

U.S. PATENT DOCUMENTS 5,427,011  6/1995  Tsuji et al. .......................... 524/788

*Primary Examiner*—Melvyn I. Marquis
*Attorney, Agent, or Firm*—Roger H. Borrousch

[57] ABSTRACT

A room temperature-curable organopolysiloxane composition with excellent extrudability and self-extinguishing properties is made from a hydroxyl endblocked polydiorganosiloxane, aluminum hydroxide having an average particle size not exceeding 50 micrometers, colloidal calcium carbonate, platinum or a platinum compound, and a crosslinking silane or siloxane having at least three hydrolyzable groups.

18 Claims, No Drawings

ROOM TEMERATURE-CURABLE ORGANOPOLYSILOXANE COMPOSITION

BACKGROUND OF THE INVENTION

1. Technical Field

The present invention relates to a room temperature-curable organopolysiloxane composition, and, more particularly, relates to a room temperature-curable organopolysiloxane composition which cures to give an excellent self-extinguishing silicone rubber.

2. Prior Art and Problems to Be Solved by the Invention

Room temperature-curable organopolysiloxane compositions exhibit a number of excellent properties, and as a consequence have entered into service in a variety of fields, for example, civil engineering, construction, general industry, and the electrical and electronics sectors. Nevertheless, these compositions generally suffer from the problem of poor self-extinguishability. There have been attempts at improving their self-extinguishability through the addition to the particular composition of large quantities of an extender filler such as crystalline silica, aluminum hydroxide, titanium dioxide, or carbon black, but each of these is associated with a poor workability. Specifically, the fatal drawback is poor extrudability from the container or cartridge.

The present inventors carried out extensive research in order to solve the aforementioned drawbacks, and the present invention was developed as a result.

In addition, when platinum or a platinum compound is also mixed into such compositions along with aluminum hydroxide in an attempt to improve the self-extinguishability, one finds that the self-extinguishability is still unsatisfactory.

SUMMARY OF THE INVENTION

An object of the present invention is a room temperature-curable organopolysiloxane composition which manifests an excellent pre-cure extrudability from containers and which cures to give an excellent self-extinguishing silicone rubber. Means Solving the Problems and Function Thereof The present invention relates to a room temperature-curable organopolysiloxane composition comprising (A) 100 parts by weight of hydroxyl group-terminated polydiorganosiloxane having a viscosity at 25° C. of 0.100 to 500 Pa.s (pascal-seconds), (B) 50 to 100 parts by weight of aluminum hydroxide microparticles having an average particle diameter not exceeding 50 micrometers, (C) 50 to 100 parts by weight of colloidal calcium carbonate, (D) platinum or a platinum compound, in a quantity sufficient to provide 1 to 200 parts by weight platinum metal per 1,000,000 parts by weight component (A), and (E) 0.5 to 20 parts by weight of a silicon compound which contains at least 3 Si-bonded hydrolyzable groups in each molecule, where the silicon compound is a silane, siloxane, or mixture of silane and siloxane.

DESCRIPTION OF THE PREFERRED EMBODIMENTS

The polydiorganosiloxane comprising component (A) is the principal or base component of the composition according to the present invention. Its molecular terminals must be end-blocked by the hydroxyl group. This polydiorganosiloxane is exemplified by alpha, omega-dihydroxypolydiorganosiloxanes with the following general formula.

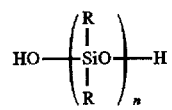

In the preceding formula, each R is a substituted or an unsubstituted monovalent hydrocarbon group, and n is a number which provides polydiorganosiloxane viscosities of 0.1 to 500 Pa.s and preferably 0.5 to 100 Pa.s at 25° C.

Examples of R are monovalent hydrocarbon groups as exemplified by alkyl groups such as methyl, ethyl, isopropyl, hexyl, and octadecyl; alkenyl groups such as vinyl and hexenyl; cycloalkyl groups such as cyclohexyl and cyclopentyl; alkaryl groups such as benzyl and beta-phenylethyl; and aromatic hydrocarbon groups such as phenyl, xenyl, naphthyl, tolyl, and xylyl. R may also be those substituted hydrocarbon groups obtained by replacing hydrogen in the aforesaid monovalent hydrocarbon groups with a cyano group or halogen such as beta-cyanoethyl, 1,1,1-trifluoropropyl, or perfluorobutyl. R may consist of only a single species within the individual molecule, or a combination of several species may be present in each molecule. Taking into consideration ease of synthesis and the balance between the viscosity of the uncured composition and the post-cure mechanical properties, it will be preferred within the context of the present invention that methyl comprise much or all of the groups R, with vinyl or phenyl accounting for any remaining groups R. The composition according to the present invention has a reduced extrudability when the viscosity exceeds 500 Pa.s. On the other hand, when the viscosity falls below 0.1 Pa.s, the elasticity or extensibility of the cured rubber is so low that it cannot tolerate in practical applications.

The aluminum hydroxide micropowder of component (B) of the present invention is an essential component for imparting self-extinguishability to the composition. The average particle size of component (B) must not exceed 50 micrometers: when the average particle size exceeds 50 micrometers, the self-extinguishability deteriorates and/or the post-cure rubber properties are impaired. Preferably, the average particle size is less than 10 micrometers.

Aluminum hydroxide should be added at 50 to 100 parts by weight per 100 parts by weight of component (A). The self-extinguishability is impaired at less than 50 parts by weight while the extrudability is impaired at additions in excess of 100 parts by weight.

The colloidal calcium carbonate of component (C) is an essential component for simultaneously equipping the composition according to the present invention with self-extinguishability, suitable rubber properties, and a good extrudability.

As is known in the concerned art, calcium carbonate is available as heavy calcium carbonate, light calcium carbonate, and colloidal calcium carbonate; however, the composition according to the present invention can make use of only colloidal calcium carbonate, which has the smallest particle size among these grades. The invention does not require that the surface of the calcium carbonate be either treated or untreated, but treatment with, for example, an aliphatic acid, resin acid, or surfactant, is preferred. Preferably, the average particle size is less than one micrometer.

Component (C) should be added at 50 to 100 parts by weight per 100 parts by weight of component (A). The self-extinguishability and rubber properties are impaired at less than 50 parts by weight, while the extrudability is compromised at more than 100 parts by weight.

The platinum or platinum compound of component (D) is an essential component for imparting self-extinguishability. It should be added at 1 to 200 parts by weight as platinum metal and preferably at 10 to 100 parts by weight as platinum metal per one million parts by weight component (A). Self-extinguishability is not manifested at less than 1 parts by weight, while exceeding 200 parts by weight is uneconomical because doing so does not result in further improvement in the self-extinguishability. Component (D) is exemplified by platinum micropowders; platinum powder supported on a carrier such as alumina, silica gel, or asbestos; chloroplatinic acid; and complexes between chloroplatinic acid and alcohols, ethers, aldehydes, or vinylsiloxanes.

To support its dispersion in the composition, the platinum or platinum compound should be used dissolved or dispersed in organopolysiloxane oil or an organic solvent such as isopropanol, ethanol, benzene, toluene, or xylene.

Component (E) of the present invention functions as crosslinker for the composition. Component (E) is a silicon compound containing at least 3 Si-bonded hydrolyzable groups in each molecule. The hydrolyzable groups are selected from the group consisting of alkoxy, haloalkoxy, alkoxyalkoxy, alkenyloxy, ketoximo, amino, acetamido, and aminoxy.

This silicon compound can be a silane, a siloxane, or a mixture of a silane and a siloxane is exemplified as follows: alkoxysilanes such as tetraethoxysilane, methyltrimethoxysilane, ethyltrimethoxysilane, vinyltrimethoxysilane, 3,3,3-trifluoropropyltrimethoxysilane, beta-cyanoethyltrimethoxysilane, tetraisopropoxysilane, tetrabutoxysilane, phenyltrimethoxysilane, and octadecyltrimethoxysilane; halogenoalkoxysilanes such as tetra(beta-chloroethoxy)silane, tetra(2,2,2-trifluoroethoxy)silane, and propyltris(delta-chlorobutoxy)silane; alkoxyalkoxysilanes such as methyltris(methoxyethoxy)silane; alkoxysiloxanes such as ethyl polysilicate and dimethyltetramethoxydisiloxane; ketoximosilanes such as methyltris(methyl ethyl ketoximo)silane, vinyltris(methyl ethyl ketoximo)-silane, phenyltris(methyl ethyl ketoximo)silane, methyltris-(diethyl ketoximo)silane, and tetra(methyl ethyl ketoximo)-silane; aminosilanes such as methyltris(cyclohexylamino)silane, and vinyltris(n-butylamino)silane; acetamidosilanes such as methyltris(N-methylacetamido)silane, methyltris(N-butylacetamido)silane, methyltris(N-cyclohexylacetamido) silane; aminoxysilanes such as methyltris(N,N-diethylaminoxy)silane; alkenyloxysilanes such as methyltri (isopropenoxy)silane and vinyltri(isopropenoxy)silane; and aminoxysiloxanes such as

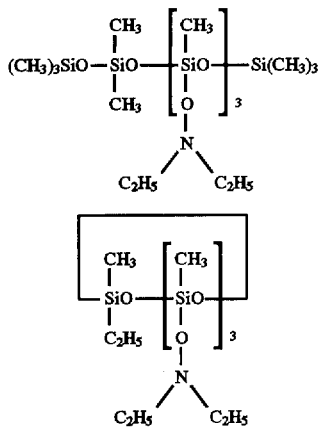

These silanes and siloxanes should be added with the range of 0.5 to 20 parts by weight per 100 parts by weight component (A). The specific quantity of component (E) should be optimally selected in accordance with, for example, the quantity of water in the composition and whether the composition of the present invention is to be formulated in a single-package or two-package configuration.

The composition according to the present invention may also contain as chain extenders, on a supplementary basis, difunctional silane and/or difunctional siloxane for the purpose of increasing the elongated or extensibility and reducing the modulus. These difunctional silanes and siloxanes have two hydrolyzable groups per molecule.

The aforesaid difunctional silanes and siloxanes are exemplified as follows: dimethylbis(N-methylacetamido) silane, dimethylbis(N-ethylacetamido)silane, diphenylbis (diethylaminoxy)silane, methylphenylbis(diethylaminoxy) silane, diphenyldimethoxysilane, and siloxanes as follows:

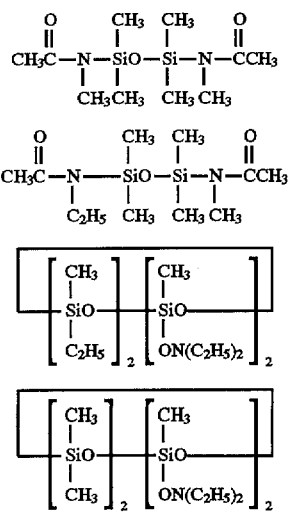

Furthermore, the composition according to the present invention may optionally contain a catalyst in order to accelerate the cure between components (A) and (E). Suitable catalysts are exemplified by the metal salts of monocarboxylic acids such as lead 2-ethyloctoate, dibutyltin diacetate, dibutyltin 2-ethylhexoate, dibutyltin dilaurate, butyltin tri-2-ethylhexoate, dibutyltin acetylacetonate, iron 2-ethylhexoate, cobalt 2-ethylhexoate, manganese 2-ethylhexoate, stannous caprylate, tin naphthenate, tin oleate, tin butyrate, zinc naphthenate, zinc stearate, and titanium naphthenate; titanate catalyst such as tetrabutyl titanate, tetraphenyl titanate, tetra-2-ethylhexyl titanate, tetraoctadecyl titanate, triethanolamine titanate, and ethylene glycol titanate; the organosiloxytitanium compounds disclosed in U.S. Pat. No. 3,294,739, in which the organosiloxy group is bonded to the titanium atom via Si—O—Ti; the beta-dicarbonyltitanium compounds disclosed in U.S. Pat. No. 3,334,067 with the following general formula

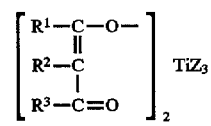

wherein $R^1$, $R^2$, and $R^3$ are monovalent hydrocarbon groups having 1 to 18 carbon atoms; Z is a group selected from the group consisting of monovalent aliphatic hydrocarbon groups, monovalent acyloxy groups, the hydroxyl group, and the divalent oxygen atom participating in the Ti—O—Ti bond; amines such as hexylamine and dodecylamine; amine salts such as hexylamine acetate and dodecylamine phosphate; quaternary ammonium salts such as benzyltrimethylammonium acetate; and alkali metal salts such as potassium acetate. The catalyst is added at 0.001 to 10 parts by weight and preferably at 0.01 to 5 parts by weight, in each case per 100 parts by weight component (A).

The composition according to the present invention is prepared simply by mixing components (A), (B), (C), (D), and (E) together along with the optional cure-accelerating catalyst as described above. Those additives known in the art for use in room temperature-curable organopolysiloxane compositions may be admixed on an optional basis within the scope of the present invention, as long as, the object of the present invention is not compromised thereby. Examples in this regard are the various organic solvents, low-molecular-weight organopolysiloxanes, fillers and pigments (e.g., magnesium oxide, alumina, zinc oxide, iron oxide), flame retardants such as manganese carbonate and azobisisobutyronitrile, heat stabilizers such as cerium hydroxide and cerium oxide, and adhesion promoters such as silane coupling agents.

The present invention will be explained in greater detail through the following illustrative examples, in which parts= parts by weight and the viscosity is the value at 25° C. The various properties considered below were measured using the following test methods.

Extrudability

The particular room temperature-curable organopolysiloxane composition was filled into a 2 mL syringe. The time required for extrusion (extrusion pressure=2 kg/cm$^2$) of the total quantity was then measured and is reported in seconds.

Rubber Properties

The particular room temperature-curable organopolysiloxane composition was cured at room temperature for 7 days to give a 3 mm-thick silicone rubber sheet. The physical properties (hardness, tensile strength, elongation) of the silicone rubber sheet thus obtained were measured in accordance with the methods in JIS K 6301.

Measurement of Self-Extinguishability

This property was measured in accordance with the flame retardancy test method of UL 94V. First, the particular room temperature-curable organopolysiloxane composition was cured to give a 0.8 mm-thick silicone rubber sheet. This sheet was then cut into a test specimen with a length of 127 mm and a width of 12.7 mm. The test specimen was hung vertically under draft-free conditions, and the bottom of the test specimen was exposed twice (10 seconds each) to the flame from a 1,000 BTU/ft$^3$ gas burner. The time (seconds) required for extinction of the flame was measured in each case. This double flame contact test was conducted on each of 5 test specimens, and the total value of the 10 observations was reported as the self-extinguishability (unit: seconds). The char length was observed and reported as less than 20 mm, greater than 20 mm, or completely consumed (127 mm).

EXAMPLE 1

The following were mixed at room temperature and in the sequence given into 100 parts alpha, omega-dihydroxypolydimethylsiloxane (viscosity=13 Pa.s): 100 parts aluminum hydroxide micropowder with an average particle size of 1.0 micrometers, 50 parts colloidal calcium carbonate (average particle size=0.08 micrometers) whose surface had been treated with fatty acid, and isopropanolic chloroplatinic acid solution sufficient to give 22 ppm platinum metal. The resulting mixture was then mixed in vacuo to homogeneity.

A room temperature-curable organopolysiloxane composition was then prepared by mixing to homogeneity under moisture free conditions 100 parts of the mixture obtained as above: 4.0 parts vinyltris(methyl ethyl ketoxime)silane, 0.5 part N-beta-(aminoethyl)-gamma-aminopropyltrimethoxysilane, and 0.04 part dibutyltin dilaurate. The resulting room temperature-curable organopolysiloxane composition was sealed into aluminum tubes.

The compositions's extrudability, fluidity, post-cure rubber properties (hardness, tensile strength, and elongation), and flame retardancy were then measured, and these results are reported in Table 1.

TABLE 1

| ITEM | MEASURED VALUE |
| --- | --- |
| Extrudability (seconds) | 68 |
| Fluidity | not fluid |
| Hardness (JIS A) | 65 |
| Tensile strength (kg/cm2) | 30 |
| Elongation (%) | 175 |
| Flame retardancy (seconds) | 19 |
| Char length, mm | <20 |

EXAMPLE 2

The following were mixed at room temperature and in the sequence given into 100 parts alpha, omega-dihydroxypolydimethylsiloxane (viscosity=12 Pa.s): 70 parts aluminum hydroxide micropowder with an average particle size of 1.0 micrometers, 70 parts colloidal calcium carbonate (average particle size=0.08 micrometers) whose surface had been treated with fatty acid, and isopropanolic chloroplatinic acid solution sufficient to give 22 ppm platinum metal. The resulting mixture was then mixed in vacuo to homogeneity. A room temperature-curable organopolysiloxane composition was prepared by mixing to homogeneity under moisture free conditions 100 parts of the mixture obtained above, 4.0 parts vinyltris(methyl ethyl ketoxime) silane, 0.5 part N-beta-(aminoethyl)-gamma-aminopropyltrimethoxysilane, and 0.04 part dibutyltin dilaurate. The resulting room temperature-curable organopolysiloxane composition was sealed into aluminum tubes. The compositions's extrudability, post-cure rubber properties, and flame retardancy were then measured, and these results are reported in Table 2.

COMPARISON EXAMPLE 1

A room temperature-curable organopolysiloxane composition was prepared as in Example 2, except omitting the colloidal calcium carbonate and increasing the quantity of aluminum hydroxide micropowder to 100 parts. The various properties of this composition were also measured as in Example 2, and these results are reported in Table 2.

COMPARISON EXAMPLE 2

A room temperature-curable organopolysiloxane composition was prepared as in Example 2, except omitting the colloidal calcium carbonate and increasing the quantity of aluminum hydroxide micropowder to 150 parts. The extrudability, post-cure rubber properties, and flame retardancy of the resulting composition were measured as in Example 2, and these results are reported in Table 2.

COMPARISON EXAMPLE 3

A room temperature-curable organopolysiloxane composition was prepared as in Example 2, except a precipitated calcium carbonate with an average particle size of 2.2 micrometers was used in place of the colloidal calcium carbonate employed in Example 2. The various properties of the composition thus obtained were measured as in Example 2, and these results are reported in Table 2.

COMPARISON EXAMPLE 4

A room temperature-curable organopolysiloxane composition was prepared as in Example 2, except a heavy calcium carbonate with an average particle size of 3.6 micrometers was used in place of the colloidal calcium carbonate employed in Example 2. The various properties of the composition thus obtained were measured as in Example 2, and these results are reported in Table 2.

COMPARISON EXAMPLE 5

A room temperature-curable organopolysiloxane composition was prepared as in Example 2, except 7 parts of a dry-method silica (specific surface area by the BET method= 200 m²/g) was used in place of the colloidal calcium carbonate employed in Example 2. The various properties of the composition thus obtained were measured as in Example 2, and these results are reported in Table 2.

COMPARISON EXAMPLE 6

A room temperature-curable organopolysiloxane composition was prepared as in Example 2, except the aluminum hydroxide was omitted and the amount of colloidal calcium carbonate was increased to 140 parts. The various properties of this composition were measured as described in Example 2, and these results are reported in Table 2.

TABLE 2

| | PRESENT INVENTION | COMPARISON EXAMPLES | | | | | |
|---|---|---|---|---|---|---|---|
| | | 1 | 2 | 3 | 4 | 5 | 6 |
| Extrudability (seconds) | 57 | 40 | 114 | 68 | 68 | 115 | 50 |
| Fluidity | ++ | x | ++ | + | x | + | ++ |
| Hardness (JIS A) | 55 | 33 | 63 | 52 | 46 | 20 | 61 |
| Tensile Strength (kg/cm2) | 23 | 19 | 25 | 25 | 27 | 20 | 26 |
| Elongation (%) | 250 | 320 | 170 | 200 | 220 | 450 | 230 |
| Flame Retardancy (seconds) | 25 | ** | 7 | 59 | 50 | 170 | ** |
| Char length (mm) | <20 | 127 | >20 | >20 | >20 | >20 | 127 |

++ = completely combusted
++ = not fluid
+ = semifluid
x = fluid

EXAMPLE 3

The following were mixed at room temperature and in the sequence given into 100 parts alpha, omega-dihydroxypolydimethylsiloxane (viscosity=13 Pa.s): 80 parts aluminum hydroxide micropowder with an average particle size of 1.0 micrometers, 50 parts colloidal calcium carbonate (average particle size=0.08 micrometers) whose surface had been treated with fatty acid, and isopropanolic chloroplatinic acid solution sufficient to give 22 ppm platinum metal. This mixture was then mixed in vacuo to homogeneity. A room temperature-curable organopolysiloxane composition was then prepared by mixing to homogeneity under moisture free conditions 100 parts of the mixture obtained above, 4.0 parts methyltrimethoxysilane and 1.0 part diisopropoxybis(ethyl acetoacetate)titanium. The resulting room temperature-curable organopolysiloxane composition was sealed into aluminum tubes. The composition's extrudability, post-cure rubber properties, and flame retardancy were then measured, and these results are reported in Table 3.

TABLE 3

| ITEM | MEASURED VALUE |
|---|---|
| Extrudability (seconds) | 70 |
| Fluidity | not fluid |
| Hardness (JIS A) | 61 |
| Tensile strength (kg/cm2) | 32 |
| Elongation (%) | 150 |
| Flame retardancy (seconds) | 12 |
| Char length, (mm) | <20 |

EXAMPLE 4

The following were mixed at room temperature and in the sequence given into 100 parts alpha, omega-dihydroxypolydimethylsiloxane (viscosity=13 Pa.s): 70 parts aluminum hydroxide micropowder with an average particle size of 1.0 micrometers, 70 parts colloidal calcium carbonate (average particle size=0.08 micrometers) whose surface had been treated with fatty acid, and isopropanolic chloroplatinic acid solution sufficient to give 22 ppm platinum metal. This mixture was then mixed in vacuo to homogeneity. A room temperature-curable organopolysiloxane composition was prepared by mixing to homogeneity under moisture free conditions 100 parts of the mixture obtained above, 1.2 parts of the following compound

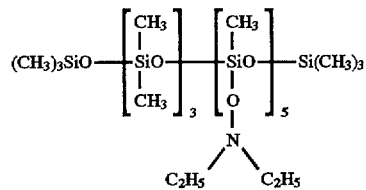

and 3.3 parts dimethylbis(N-ethylacetamide)silane. The resulting room temperature-curable organopolysiloxane composition was sealed into aluminum tubes. The composition's extrudability, post-cure rubber properties, and flame retardancy were then measured, and these results are reported in Table 4.

TABLE 4

| ITEM | MEASURED VALUE |
|---|---|
| Extrudability (seconds) | 54 |
| Fluidity | not fluid |
| Hardness (JIS A) | 5 |
| Tensile strength (kg/cm2) | 4 |
| Elongation (%) | 1400 |
| Flame retardancy (seconds) | 19 |
| Char length, (mm) | <20 |

EXAMPLE 5

The following were mixed at room temperature and in the sequence given into 100 parts alpha, omega-dihydroxypolydimethylsiloxane (viscosity=13 Pa.s): 70 parts aluminum hydroxide micropowder with an average particle size of 1.0 micrometers, 70 parts colloidal calcium carbonate (average particle size=0.08 micrometers) whose surface had been treated with fatty acid, and isopropanolic chloroplatinic acid solution sufficient to give 22 ppm platinum metal. This mixture was then mixed in vacuo to homogeneity. A room temperature-curable organopolysiloxane composition was prepared by mixing to homogeneity under moisture free conditions 100 parts of the mixture obtained above, 0.1 part of the following compound

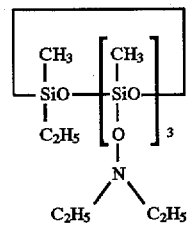

and 2.4 parts of the following compound

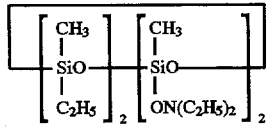

The composition's extrudability, post-cure rubber properties, and flame retardancy were then measured, and these results are reported in Table 5.

TABLE 5

| ITEM | MEASURED VALUE |
| --- | --- |
| Extrudability (seconds) | — |
| Fluidity | not fluid |
| Hardness (JIS A) | 18 |
| Tensile strength (kg/cm2) | 12 |
| Elongation (%) | 1500 |
| Flame retardancy (seconds) | 30 |
| Char length, (mm) | <20 |

EXAMPLE 6

The following were mixed at room temperature and in the sequence given into 100 parts alpha, omega-dihydroxypolydimethylsiloxane (viscosity=12 Pa.s): 50 parts colloidal calcium carbonate (average particle size=0.08 micrometers) whose surface had been treated with fatty acid: 100 parts aluminum hydroxide micro powder with an average particle size of 1.0 micrometers and isopropanolic chloroplatinic acid solution sufficient to give 22 ppm platinum metal. The resulting mixture was then mixed in vacuo to homogeneity. A room temperature-curable organopolysiloxane composition was prepared by mixing to homogeneity under moisture free conditions 100 parts of the mixture obtained as above: 4.0 parts vinyltri(methyl ethyl ketoxime) silane, 0.5 part N-beta-(aminoethyl)-gamma-aminopropyltrimethoxysilane, and 0.04 part dibutyltin dilaurate. The resulting room temperature-curable organopolysiloxane was sealed into aluminum tubes.

The compositions's extrudability, fluidability, post-cure rubber properties (hardness, tensile strength and elongation), and flame retardancy were measured, and these results were as reported in Table 6.

COMPARISON EXAMPLE 7

A room temperature-curable organopolysiloxane composition was prepared as in Example 6, except decreasing the quantity of the colloidal calcium carbonate to 20 parts. Then composition's properties were measured and were as reported in Table 6.

COMPARISON EXAMPLE 8

A room temperature-curable organopolysiloxane composition was prepared as in Example 6, except increasing the quantity of the colloidal calcium carbonate to 120 parts. The composition's properties were measured and were as reported in Table 6.

TABLE 6

| | COMPARISON EXAMPLE 7 | EXAMPLE 6 | COMPARISON EXAMPLE 8 |
| --- | --- | --- | --- |
| Composition | | | |
| Colloidal Calcium Carbonate (parts) | 20 | 50 | 120 |
| Aluminum Hydroxide Micro Powder (parts) | 100 | 100 | 100 |
| Properties | | | |
| Extrudability (seconds) | 42 | 57 | 147 |
| Fluidability | flowable | not fluid (non-sag) | not fluid (non-sag) |
| Flame Retardance (seconds) | 50 | 26 | 25 |
| Hardness (JIS-A) | 32 | 40 | 50 |
| Tensile Strength (kg/cm2) | 15 | 12 | 20 |
| Elongation (%) | 350 | 300 | 270 |

Comparison Example 6 with 20 parts of the colloidal calcium carbonate resulted in a flowable composition with poorer flame retardant properties whereas increasing the colloidal calcium carbonate to 120 parts, the composition had satisfactory flame retardant properties but the extrudability was poor.

EXAMPLES 7–10

The following were mixed at room temperature and in the sequence given into 100 parts alpha, omega-dihydroxypolydimethylsiloxane (viscosity=12 Pa.s): 5.0 methyltris (methyl ethyl ketoxime) silane as a filler treatment agent: 50–100 parts colloidal calcium carbonate (average particle size=0.08 micrometers) whose surface had been treated with fatty acid: 50–100 parts aluminum hydroxide micro powder with an average particle size of 1.0 micrometers as shown in Table 7 and chloroplatinic acid isopropyl alcohol solution sufficient to give 22 ppm platinum metal. The resulting mixture was then mixed in vacuo to homogeneity. The specific amounts of colloidal calcium carbonate and aluminum hydroxide micro powder used in each example was as shown in Table 7.

A room temperature-curable organopolysiloxane composition was then prepared by mixing to homogeneity under moisture free conditions 100 parts of the mixture obtained as above: 5.0 parts vinyl tris (methyl ethyl ketoxime) silane, 1.25 parts N-beta-(aminoethyl)-gamma-aminopropyltrimethoxysilane, and 0.16 part dibutyltin dilaurate. The resulting room temperature-curable organopolysiloxane was sealed into aluminum tubes.

The composition extrudability, fluidability, post-cure rubber properties (hardness, tensile strength and elongation), and flame retardancy were measured, and these results were as shown in Table 7.

TABLE 7

|  | Example 7 | Example 8 | Example 9 | Example 10 |
|---|---|---|---|---|
| Composition |  |  |  |  |
| Aluminum Hydroxide micro powder (part) | 50 | 100 | 50 | 100 |
| Colloidal calcium carbonate (part) | 50 | 50 | 100 | 100 |
| Properties |  |  |  |  |
| Extrudability (seconds) | 27 | 52 | 57 | 72 |
| Fluidability | not fluid (non-sag) | not fluid (non-sag) | not fluid (non-sag) | not fluid (non-sag) |
| Flame retardancy | 73 | 52 | 26 | 10 |
| Hardness (JIS-A) | 23 | 40 | 37 | 48 |
| Tensile Strength (kg/cm2) | 13 | 12 | 14 | 16 |
| Elongation (%) | 450 | 300 | 300 | 280 |

Effects of the Invention

Because the room temperature-curable organopolysiloxane composition according to the present invention is composed of components (A) through (E), and in particular because it contains the quantities of specific components of (B), (C), and (D), it is characterized both by an excellent extrudability from containers prior to its cure and by the ability to cure into an excellent self-extinguishing silicone rubber.

That which is claimed is:

1. A room temperature-curable organopolysiloxane composition comprising
   (A) 100 parts by weight of hydroxyl group-terminated polydiorganosiloxane having a viscosity at 25° C. of 100 to 500,000 centipoise,
   (B) 50 to 100 parts by weight of aluminum hydroxide microparticles having an average particle diameter not exceeding 50 micrometers,
   (C) 50 to 100 parts by weight of colloidal calcium carbonate,
   (D) platinum or a platinum compound, in a quantity sufficient to provide 1 to 200 parts by weight platinum metal per 1,000,000 parts by weight of component (A), and
   (E) 0.5 to 20 parts by weight of a silicon compound which contains at least 3 Si-bonded hydrolyzable groups in each molecule, where the silicon compound is a silane, siloxane, or mixture of silane and siloxane.

2. The room temperature-curable organopolysiloxane composition according to claim 1 in which the hydrolyzable groups are selected from the group consisting of alkoxy, haloalkoxy, alkoxyalkoxy, alkenyloxy, ketoximo, amino, acetamido, and aminoxy.

3. The room temperature-curable organopolysiloxane composition according to claim 1 in which the average particle size of the aluminum hydroxide of (B) is less than 10 micrometers.

4. The room temperature-curable organopolysiloxane composition according to claim 2 in which the average particle size of the aluminum hydroxide of (B) is less than 10 micrometers.

5. The room temperature-curable organopolysiloxane composition according to claim 1 in which the average particle size of the colloidal calcium carbonate is less than 1 micrometers.

6. The room temperature-curable organopolysiloxane composition according to claim 2 in which the average particle size of the colloidal calcium carbonate is less than 1 micrometers.

7. The room temperature-curable organopolysiloxane composition according to claim 4 in which the average particle size of the colloidal calcium carbonate is less than 1 micrometers.

8. The room temperature-curable organopolysiloxane composition according to claim 7 in which the hydrolyzable group is ketoximo.

9. The room temperature-curable organopolysiloxane composition according to claim 8 further comprising a catalyst to accelerate the cure between components (A) and (E).

10. The room temperature-curable organopolysiloxane composition according to claim 9 in which the catalyst is a metal salt of a monocarboxylic acid.

11. The room temperature-curable organopolysiloxane composition according to claim 10 in which the metal salt of monocarboxyic acid is dibutyltin dilaurate.

12. The room temperature-curable organopolysiloxane composition according to claim 11 in which the silicon compound is a mixture of N-beta(aminoethyl)-gamma-aminopropyltrimethoxysilane and vinyltris(methyl ethyl ketoximo)silane.

13. The room temperature-curable organopolysiloxane composition according to claim 7 in which the hydrolyzable group is alkoxy.

14. The room temperature-curable organopolysiloxane composition according to claim 13 in which the alkoxy is methoxy.

15. The room temperature-curable organopolysiloxane composition according to claim 14 further comprising a catalyst to accelerate the cure between components (A) and (E).

16. The room temperature-curable organopolysiloxane composition according to claim 15 in which the catalyst is a titanate.

17. The room temperature-curable organopolysiloxane composition according to claim 16 in which the titanium compound is diisopropoxybis(ethylacetoacetate)titanium.

18. The room temperature-curable organopolysiloxane composition according to claim 2 further comprising a chain extender.

* * * * *